(12) United States Patent
Kido et al.

(10) Patent No.: US 8,081,251 B2
(45) Date of Patent: Dec. 20, 2011

(54) IMAGING DEVICE AND IMAGING SYSTEM

(75) Inventors: Toshihito Kido, Osaka (JP); Takeru Butsusaki, Osaka (JP); Satoshi Fukumoto, Hyogo (JP)

(73) Assignee: Sony Corporation, Tokyo (JP)

( * ) Notice: Subject to any disclaimer, the term of this patent is extended or adjusted under 35 U.S.C. 154(b) by 338 days.

(21) Appl. No.: 12/096,505

(22) PCT Filed: Dec. 12, 2006

(86) PCT No.: PCT/JP2006/324740
§ 371 (c)(1),
(2), (4) Date: Oct. 10, 2008

(87) PCT Pub. No.: WO2007/069594
PCT Pub. Date: Jun. 21, 2007

(65) Prior Publication Data
US 2009/0251554 A1    Oct. 8, 2009

(51) Int. Cl.
*H04N 5/222* (2006.01)
*H04N 5/225* (2006.01)
(52) U.S. Cl. .................... 348/333.11; 348/340
(58) Field of Classification Search ............... 348/222.1, 348/333.08, 335, 340–341, 333.11, 333.12; 396/446
See application file for complete search history.

(56) References Cited

U.S. PATENT DOCUMENTS

| | | | |
|---|---|---|---|
| 6,700,607 B1 | 3/2004 | Misawa | |
| 7,151,570 B2 * | 12/2006 | Kaneda | 348/360 |
| 7,388,607 B2 * | 6/2008 | Nakahira | 348/240.2 |
| 7,671,917 B2 * | 3/2010 | Izukawa | 348/340 |
| 2002/0158973 A1 | 10/2002 | Gomi | |

FOREIGN PATENT DOCUMENTS

| | | |
|---|---|---|
| EP | 1 460 837 A2 | 9/2004 |
| EP | 1 542 455 A2 | 6/2005 |
| JP | 2000-50138 | 2/2000 |
| JP | 2000-278591 | 10/2000 |
| JP | 2000 278591 | 10/2000 |
| JP | 2001 125173 | 5/2001 |
| JP | 2002-330329 | 11/2002 |

(Continued)

OTHER PUBLICATIONS

Extended European Search Report issued Oct. 25, 2010, in Patent Application No. 06834495.1.

*Primary Examiner* — Trung Diep
(74) *Attorney, Agent, or Firm* — Oblon, Spivak, McClelland, Maier & Neustadt, L.L.P.

(57) ABSTRACT

A plurality of exchange lenses designed for object exposure regions of different sizes can be selectively mounted on the present imaging device. The imaging device determines whether a mismatch state is present, in which the size of the object exposure region of an exchange lens mounted is smaller than the size of the imaging region of an imaging element. If it is determined that a mismatch state is present, an image of a partial region of the imaging region is generated and the image of the partial region is displayed as a live view image in a relatively large area (an area larger than an area for displaying the partial region in a live view display when no mismatch state is present). Accordingly, techniques for performing a live view display with favorable visibility are provided.

9 Claims, 12 Drawing Sheets

FOREIGN PATENT DOCUMENTS

| | | |
|---|---|---|
| JP | 2002 330329 | 11/2002 |
| JP | 2003-18449 | 1/2003 |
| JP | 2003 18449 | 1/2003 |
| JP | 2003-61048 | 2/2003 |
| JP | 2003 61048 | 2/2003 |
| JP | 2004-282686 | 10/2004 |
| JP | 2005 173501 | 6/2005 |
| JP | 2005-173501 | 6/2005 |
| JP | 2005 176147 | 6/2005 |
| JP | 2005-176147 | 6/2005 |
| JP | 2006-115117 | 4/2006 |
| JP | 2006 115117 | 4/2006 |

* cited by examiner

III-III

GA(GA3)

GB(GB3)

GB

IMAGING DEVICE AND IMAGING SYSTEM

TECHNICAL FIELD

The present invention relates to imaging devices on which an exchange lens can be mounted or dismounted, and to techniques relating thereto.

BACKGROUND ART

In an imaging operation using a single-lens reflex-type camera, generally, a composition determining operation is performed, in which light incident on an imaging lens is guided to an optical finder through a pentaprism or the like to visually recognize a subject.

Of single-lens reflex-type cameras, in the case of a digital camera including an imaging element (CCD, CMOS, or the like), in addition to the composition determining operation using the optical finder described above, in some cases, a preview operation (live view operation) is needed, in which a subject image incident on an imaging element is displayed on a liquid crystal display (LCD) as an image for checking the subject to visually recognize the subject.

As techniques for meeting such a need, for example, techniques disclosed in Japanese Unexamined Patent Application Publication No. 2001-125173 exist. According to the techniques, a whole image regarding a subject, incident on an imaging element, is displayed on an LCD or the like as an image for previewing (live view image).

DISCLOSURE OF INVENTION

By the way, as bodies of digital cameras (camera bodies) on which exchange lenses can be mounted, although there are many that have thereon imaging elements having APS-size imaging regions (exposure regions), there also exist those that have thereon imaging elements having imaging regions of sizes larger than the APS size, for example, the 35-mm full size.

However, if an exchange lens designed for an APS-size exposure region is mounted on a camera body that has thereon an imaging element having a 35-mm full-size exposure region (imaging region), vignetting occurs in a peripheral portion of the imaging region due to insufficiency of an image circle, so that a state occurs where it is difficult to achieve appropriate imaging.

As techniques for solving the problem described above, for example, in the case where an exchange lens designed for an APS-size exposure region is mounted on a digital camera that has thereon an imaging element having a full-size exposure region to perform imaging, it is conceivable to cut out an image of a region corresponding to the APS-size exposure region from the full-size exposure region by trimming.

However, since the image of the portion that is cut out (the region corresponding to the APS-size exposure region) is smaller than the original size (full size), if the live view display described in Japanese Unexamined Patent Application Publication No. 2001-125173 described above is performed in this case, the portion that is cut out is displayed in a small size on an LCD or the like, so that the problem of poor visibility arises. Accordingly, an object of the present invention is to provide techniques that enable live view display with favorable visibility.

In order to solve the problem described above, the invention according to claim 1 is an imaging device on which a plurality of exchange lenses designed for object exposure regions of different sizes can be selectively mounted, the imaging device being characterized by comprising an imaging element having an imaging region; display means capable of displaying an image acquired by the imaging element as a live view image; determining means for determining whether a mismatch state is present, which is a state where the size of an object exposure region of an exchange lens mounted on the imaging device is smaller than the size of the imaging region; and display control means for generating an image of a partial region of the imaging region in a case where it is determined that the mismatch state is present, and displaying the image of the partial region in an area on the display means as the live view image, the area being larger than an area where the partial region is displayed in a live view display when the mismatch state is not present.

The invention according to claim 2 is characterized in that, in the imaging device of the invention according to claim 1, the partial region is a region corresponding to the object exposure region of the exchange lens mounted on the imaging device.

The invention according to claim 3 is characterized in that, in the imaging device of the invention according to claim 1 or claim 2, in a case where it is determined that the mismatch state is present, compared with a case where it is determined that the mismatch state is not present, the display control means reduces the degree of decimation at a time of reading from the imaging element in reading an image of the partial region.

The invention according to claim 4 is characterized in that, in the imaging device of the invention according to claim 1 or claim 2, in a case where it is determined that the mismatch state is present, the display control means changes a decimation ratio at a time of reading from the imaging element suitably in accordance with the size of the display region of the display means in reading an image of the partial region.

The invention according to claim 5 is characterized in that, in the imaging device of the invention according to claim 1 or claim 2, in a case where it is determined that the mismatch state is present, the display controller reads an image from the imaging element at the same decimation ratio as in a case where it is determined that the mismatch state is not present, and displays on the display means an enlarged image obtained by executing a resolution conversion process of increasing the number of pixels on an image corresponding to the partial region in the image that has been read.

The invention according to claim 6 is an imaging system including an exchange lens and an imaging device on which the exchange lens can be mounted or dismounted, characterized in that a plurality of exchange lenses designed for object exposure regions of different sizes can be selectively mounted on the imaging device, and the imaging device includes an imaging element having an imaging region; display means capable of displaying an image acquired by the imaging element as a live view image; determining means for determining whether a mismatch state is present, which is a state where the size of an object exposure region of an exchange lens mounted on the imaging device is smaller than the size of the imaging region; and display control means for generating an image of a partial region of the imaging region in a case where it is determined that the mismatch state is present, and displaying the image of the partial region in an area on the display means as the live view image, the area being larger than an area where the partial region is displayed in a live view display when the mismatch state is not present.

With the inventions according to claim 1 to claim 6, since an image cut out from the imaging element is displayed relatively large on the display means, a relatively high visibility can be achieved.

Particularly, with the inventions according to claim 3 and claim 4, it becomes possible to perform a live view display that can present a sense of a high resolution.

BEST MODES FOR CARRYING OUT THE INVENTION

Now, an embodiment of the present invention will be described with reference to the drawings.

<1. Overview of the Imaging System>

Figure 1:
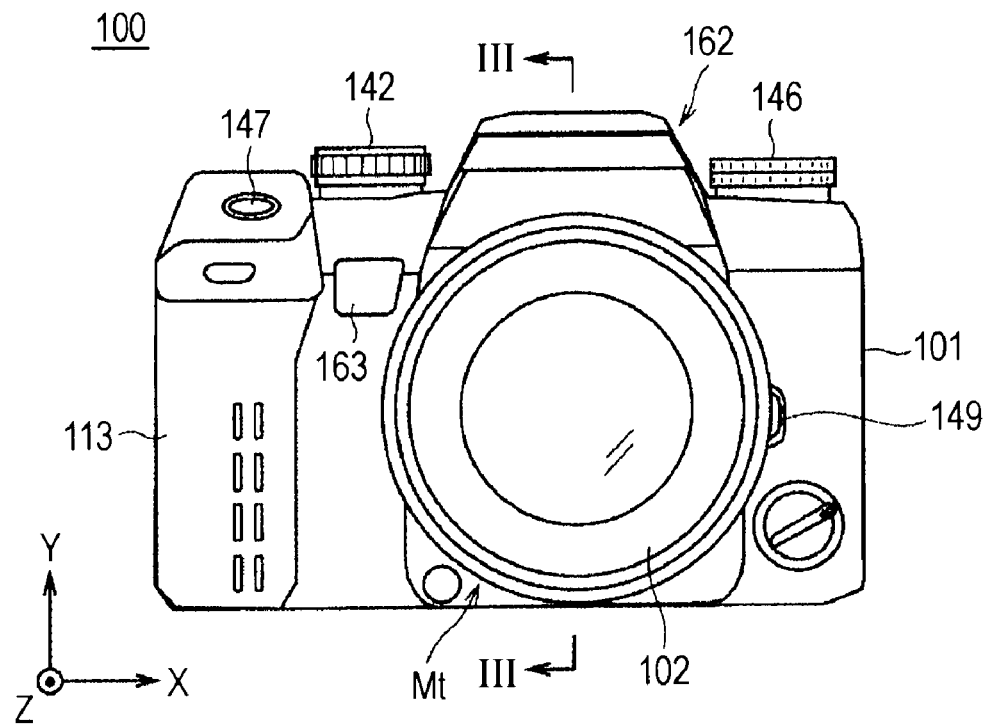
FIG. 1 is a front view showing the external configuration of an imaging system.
Figure 2:
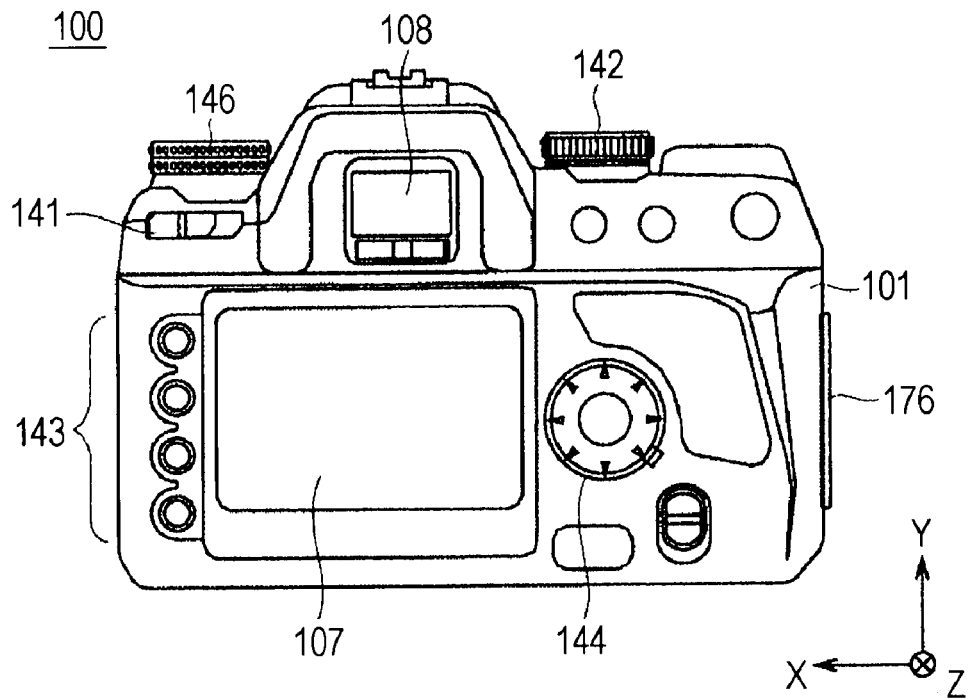
FIG. 2 is a rear view showing the external configuration of the imaging system.
Figure 3:
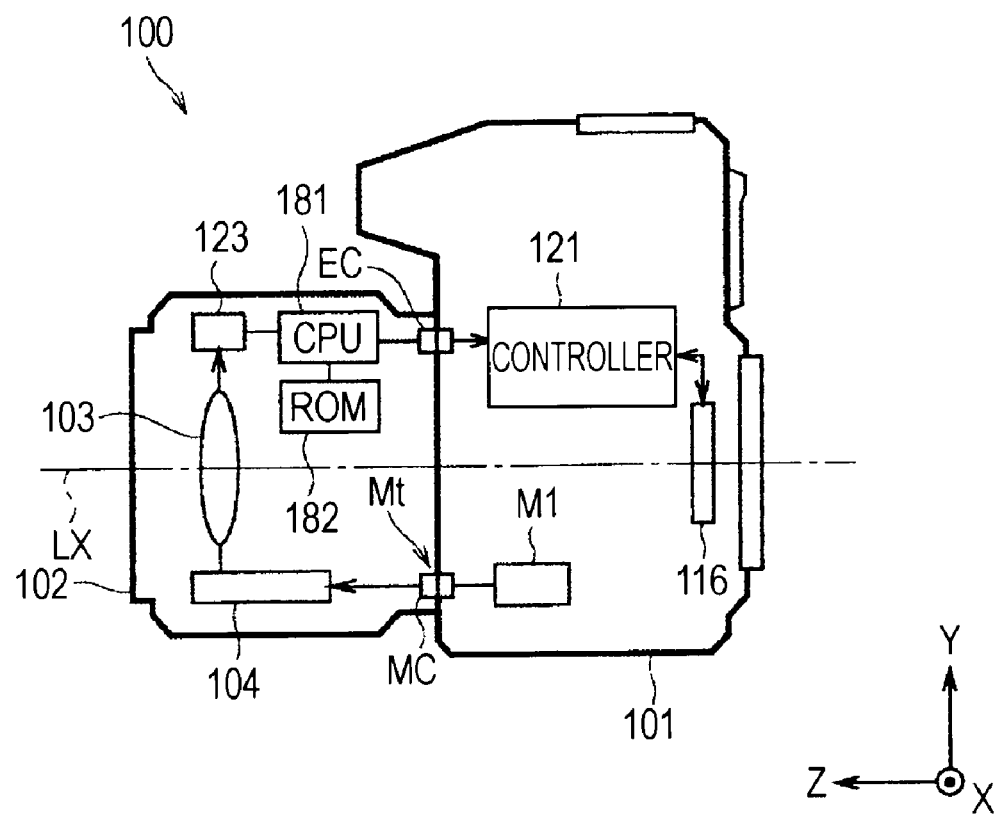
FIG. 3 is a schematic illustration showing a section viewed from the position of III-III in FIG. 1.

FIGS. 1 and 2 are illustrations showing the external configuration of an imaging system 100 according to an embodiment of the present invention. Here, FIG. 1 is a front external view of the imaging system 100, and FIG. 2 is a rear external view of the imaging system 100. Furthermore, FIG. 3 is a schematic illustration showing a section viewed from a position of III-III in FIG. 1.

As shown in FIG. 1, the imaging system 100 is configured as a single-lens reflex-type digital still camera (digital single-lens reflex camera) having a camera body 101 and an exchange lens 102 mounted substantially at the center of the front face of the camera body 101 in such a manner that it can be mounted or dismounted.

Referring to FIG. 1, the camera body (imaging device) 101 has a mounting portion Mt where the exchange lens 102 is mounted, and a mount/dismount button 149 for mounting or dismounting an exchange lens, provided substantially at the center of the front face, and a grip portion 113 for holding by a person who performs imaging, and an AF-auxiliary-light emitting unit 163 that performs irradiation with auxiliary light for AF, provided at a left end portion of the front surface.

The camera body 101 has a control-value setting dial 146 for setting control values, provided in an upper right portion of the front surface thereof, a mode setting dial 142 for switching the imaging mode, provided in an upper left portion of the front surface, and a release button 147 for instructing start of exposure, provided on a top face of the grip portion 113. Furthermore, the camera body 101 includes a flash 162 that emits light for irradiating a subject at the time of flash imaging.

Furthermore, as shown in FIG. 3, in the mounting portion Mt, a connector EC for forming an electrical connection and a coupler MC for forming a mechanical connection with a CPU 181 in the mounted exchange lens 102 are provided.

The connector EC is used to send lens information from a lens ROM (read-only memory) 182 included in the exchange lens 102 via the CPU 181 to a general controller 121 in the camera body 101, the lens information representing the type, model number, and so forth regarding the lens, and to send out a lens position of a focus lens 103 or the like, detected by a lens-position detector 123, to the general controller 121.

The coupler MC transmits a driving force of a motor M1 for driving a focus lens, provided in the camera body 101, to a lens driving mechanism 104 in the exchange lens 102, whereby the focus lens 103 is moved by the lens driving mechanism 104 in an optical-axis direction LX.

Referring to FIG. 1, a battery containing room and a card containing room are provided inside the grip portion 113. In the battery containing room, as a power source for the camera, for example, four AA batteries are contained, and in the card containing room, a memory card 176 for recording image data of images that have been taken is contained in such a manner that it can be mounted or dismounted.

The mode setting dial 142 is used to set various modes of the camera (including a still-picture shooting mode for shooting a still picture, a moving-picture shooting mode for shooting a moving picture, a playing mode of playing a picture that has been taken, a communication mode of performing data communication with an external device, and so forth).

The release button 147 is a two-stage switch configured such that an operation for "half-pressed state S1", in which it is pressed to an intermediate point, and an operation for "full-pressed state S2", in which it is pressed further, are allowed. In the still-picture shooting mode, when the release button 147 is half-pressed, preparatory operations for shooting a still picture of a subject (preparatory operations for setting of an exposure control value, focus adjustment, and so forth) are performed, and when the release button 147 is full-pressed, a shooting operation (a series of operations for exposing an imaging element 116 and executing predetermined image processing on image signals obtained through the exposure, which will be described later) is performed.

Referring to FIG. 2, in an upper portion substantially at the center of the rear face of the camera body 101, a finder window 108 is provided. To the finder window 108, a subject image is guided from the exchange lens 102. A person who shoots a picture can visually recognize a subject by looking into the finder window 108. More specifically, the subject image passing through the exchange lens 102 is reflected upward by a mirror mechanism 126 (see FIG. 5), and an image passing through a pentaprism 117 (see FIG. 5) is viewed via an eyepiece lens 118 (see FIG. 5), whereby the subject image can be visually recognized. Note that a liquid crystal display unit that displays a shutter speed, an aperture value, and other various types of information indicating the status of the imaging system 100 is included in the finder window 108. Thus, the person who shoots a picture can check various states of the imaging system 100 by looking into the finder window 108.

Substantially at the center of the rear face of the camera body 101, a rear monitor 107 is provided. The rear monitor 107 is configured as, for example, a color liquid crystal display, and it can display a menu screen for setting an imaging condition or the like, and in the playing mode, it can play and display a picture that has been taken and recorded on the memory card 176, and so forth.

Furthermore, as will be described later, by displaying a live view image on the rear monitor 107, it is possible to visually recognize a subject.

In the imaging system 100, it is possible to selectively perform either a composition determining operation using an optical finder or a composition determining operation using a live view display.

In an upper left portion of the rear monitor 107, a main switch 141 is provided. The main switch 141 is formed of a two-point slide switch. When the contact point is set to an "OFF" position on the left side, power is turned off, and when set to an "ON" position on the right side of the contact point, power is turned on.

On the right side of the rear monitor 107, a direction selecting key 144 is provided. The direction selecting key 144 has an operation button having a circular shape, and is configured such that pressing operations in four directions of up, down, left, and right and pressing operations in four directions of up-right, up-left, down-right, and down-left of the operation button are detected individually. Note that the direction selecting key 144 is configured such that a pressing operation of a push button in a central portion is detected separately from the pressing operations in the above eight directions.

At a position on the left side of the rear monitor 107, a setting button set 143 including a plurality of buttons for performing setting of a menu screen, deletion of an image, and so forth is provided.

Figure 4:
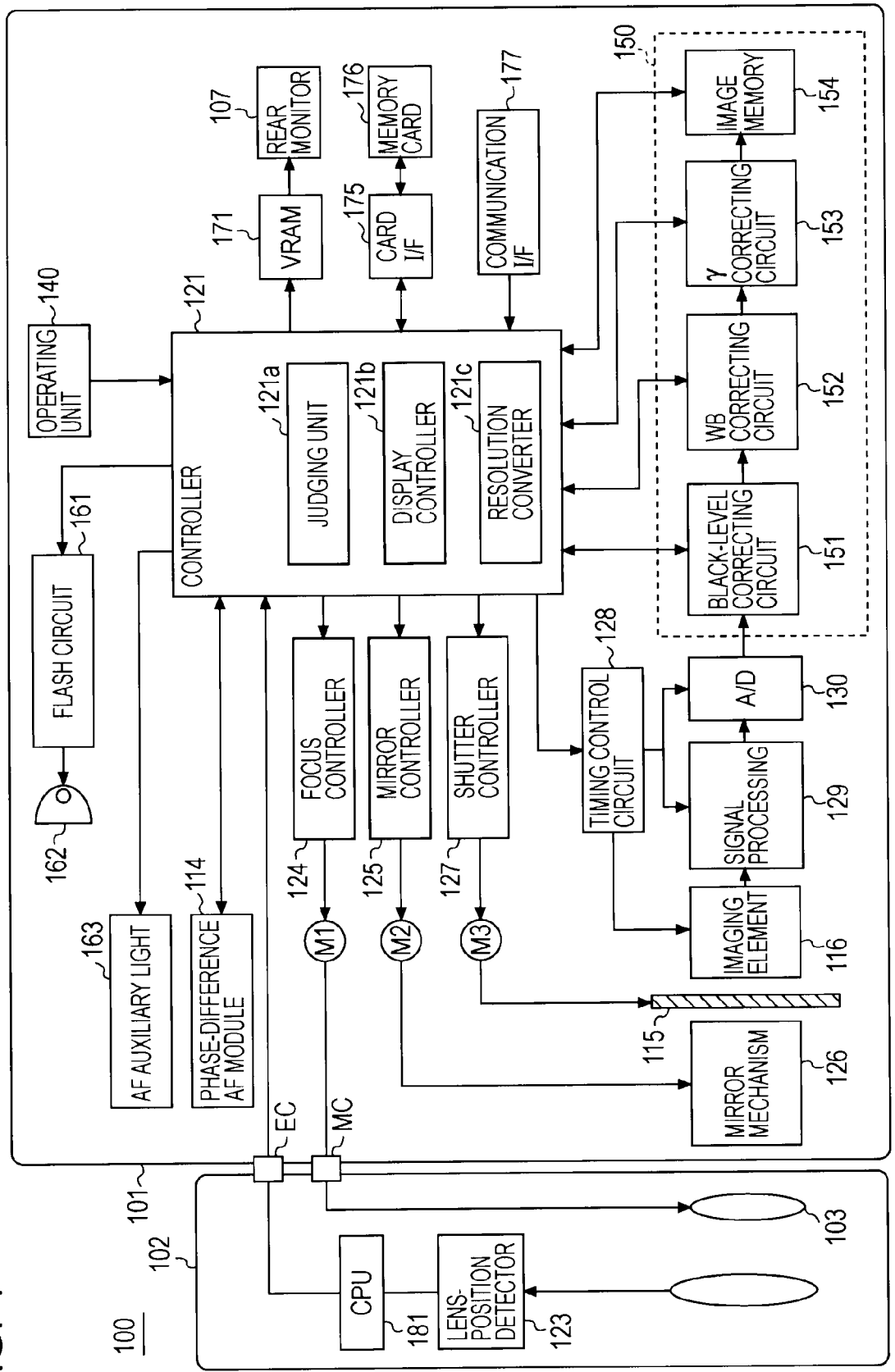
FIG. 4 is a block diagram showing the functional configuration of the imaging system.

FIG. 4 is a block diagram showing the functional configuration of the imaging system 100.

In the imaging system 100, the controller 121 is a main microcomputer that generally controls the imaging system 100 on the basis of instructions input from an operation unit 140 by a person who shoots a picture, the position of the focus lens 103 detected by the lens-position detector 123, and so forth. For example, the controller 121 has functions as a determining unit 121*a* that determines whether a mismatch state ST0 (described later) is present, a display controller 121*b* that controls a display operation on the rear monitor 107, a resolution converter 121*c* that converts the resolution of an image, and so forth.

The operation unit 140 is configured of the main switch 141, the mode setting dial 142, the setting button set 143, the release button 147, and so forth described above.

The controller 121, using the CPU 181 in the exchange lens 102, detects the lens position of the focus lens 103 or the like, detected by the lens-position detector 123. Then, the controller 121 controls the motor M1 using a focus controller 124 to drive the focus lens 103 in the exchange lens 102. Here, focus control can be performed by moving the focus lens 103 in accordance with a defocus amount calculated by a phase-difference AF module 114.

The controller 121 controls a motor M2 using a mirror controller 125 to drive a quick return mirror MR (FIG. 5), etc. in the mirror mechanism 126.

The controller 121 controls a motor M3 using a shutter controller 127 to drive a mechanical shutter 115.

The controller 121 controls the imaging element 116 (CCD imaging element herein), a signal processor 129, and an A/D converter 130 using a timing control circuit 128.

The imaging element 116 has an imaging region of a size (36 mm×24 mm) corresponding to, for example, a 35-mm full-size film. An image of analog signals picked up by the imaging element 116 is converted into image data of digital signals in the signal processor 129 and the A/D converter 130, which is input to an image processor 150. In the image processor 150, the image data undergoes image processing individually in a black-level correcting circuit 151, a WB correcting circuit 152, and a γ correcting circuit 153, and is stored in an image memory 154.

The imaging element 116 has three modes as its driving modes (reading modes), i.e., "real shooting mode MD0", "(first) live view mode MD1", and "(second) live view mode MD2". The controller 121 selects a specific mode from among these reading modes in accordance with the operation status and the content of setting, and specifies the selected mode to the timing control circuit 128. Then, the timing control circuit 128 drives the imaging element 116 according to the content of specification.

The "real shooting mode MD0" is a mode for reading image signals using an entire frame image (all the 3000×2000 pixels herein) as a subject of reading. The mode MD0 is used when generating a still picture for recording.

The "live view mode MD1" and the "live view mode MD2" are both modes for reading image signals in a decimated manner, and a quicker reading process is allowed compared with the real shooting mode MD0. Both of the live view modes MD1 and MD2 are used when generating images for previewing (also referred to as live view) immediately before taking images for recording, or the like.

Furthermore, as will be described later, the "live view mode MD1" and the "live view mode MD2" have mutually different decimation ratios, extracting ranges, and so forth, and switching between the modes MD1 and MD2 is performed in accordance with the size of the image circle of the exchange lens, etc.

The image data processed in the image processor 150 is displayed on the rear monitor 107 using a VRAM 171, recorded on the memory card 176 using a card I/F 175, or sent to the outside using a communication I/F 177 standardized according to USB or the like.

The controller 121, as needed, causes the flash 162 to emit light via a flash circuit 161, or causes the AF-auxiliary-light emitting unit 163 to emit light.

<2. Composition Determining Operation>

As described earlier, in the imaging system 100, it is possible to selectively perform either a composition determining operation using an optical finder or a composition determining operation using a live view display.

Figure 5:
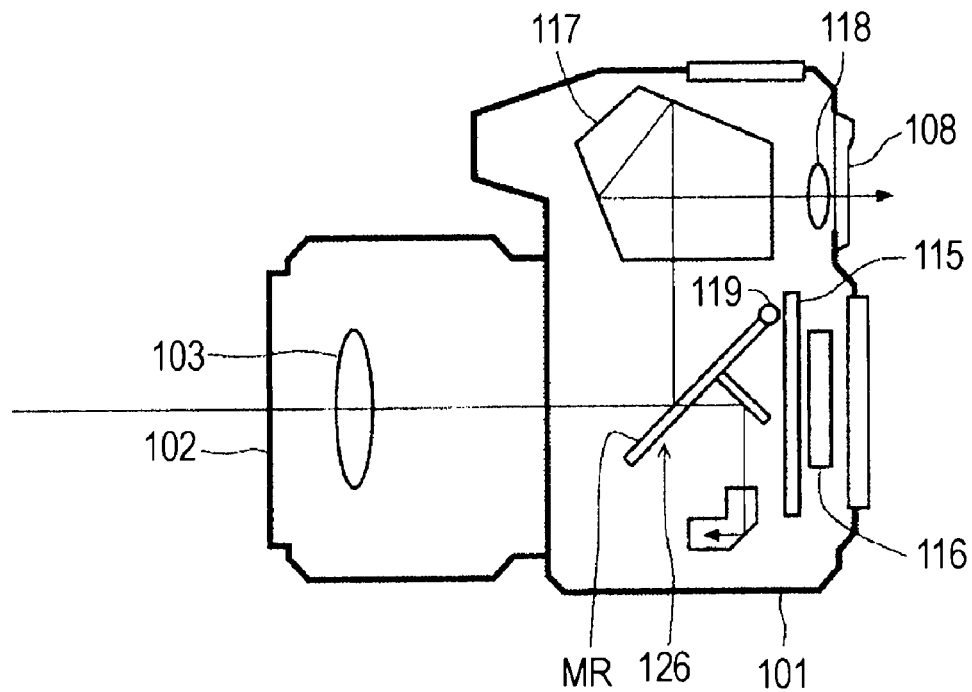
FIG. 5 is a sectional view showing a state where a subject is visually recognized using an optical finder.
Figure 6:
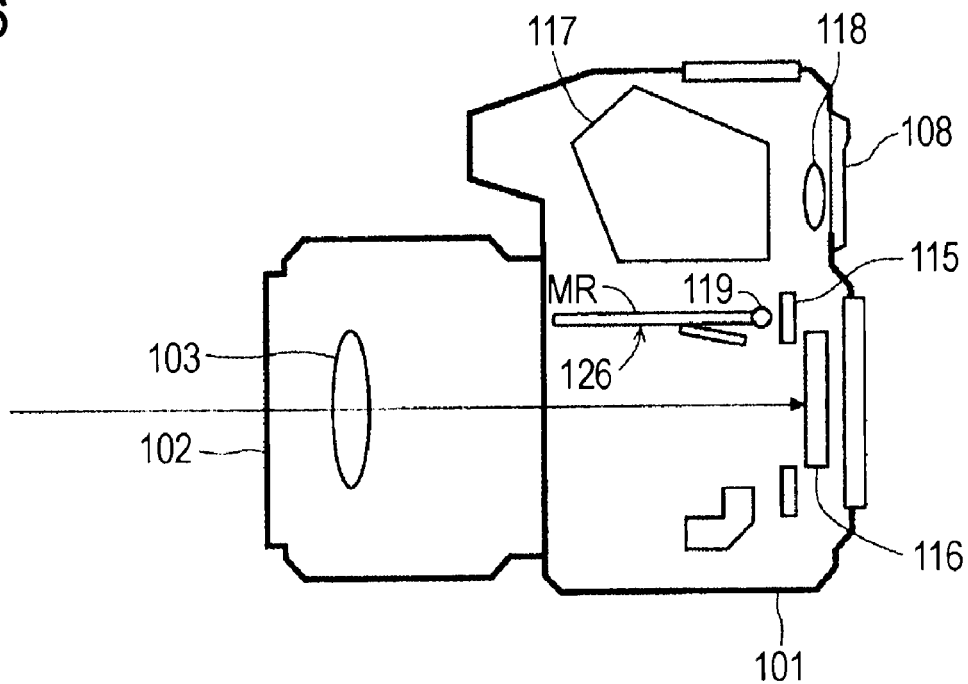
FIG. 6 is a sectional view showing a state where a subject is visually recognized using a live view display.

FIGS. 5 and 6 are sectional views of the imaging system 100 as viewed from the position of III-III in FIG. 1. FIG. 5 shows a state where a subject is visually recognized using an optical finder, and FIG. 6 shows a state where a subject is visually recognized using a live view display.

When a subject is visually recognized using an optical finder, as shown in FIG. 5, the quick return mirror MR is placed in a fallen state. Specifically, the quick return mirror MR, which is rotatable about a pivot 119, is stopped at a position slanted at an angle of 45 degrees with respect to the optical axis. Furthermore, the mechanical shutter 115 is placed in a closed state.

In the state shown in FIG. 5, light incident via the exchange lens 102 is reflected by the quick return mirror MR, is further reflected by an inside face of the pentaprism 117, and is transmitted through the eyepiece lens 118 to the finder window 108. An operator can check a subject image approximate to an actual shooting state by looking into the finder window 108.

On the other hand, when a subject is visually recognized using a live view display, as shown in FIG. 6, the quick return mirror MR is placed in a raised state.

Specifically, the quick return mirror MR is rotated upward about the pivot 119 up to a substantially horizontal position. Accordingly, light from the exchange lens 102 reaches the imaging element 116. Furthermore, the mechanical shutter 115 is placed in an opened state, and a subject image incident to the imaging element 116 is generated as electrical image data by a photoelectric conversion operation in the imaging element 116, etc.

In the case of either composition determining operation, when the composition determining operation is finished and the release button 147 is full-pressed, the state changes to that shown in FIG. 6, and an image for recording is taken.

When an image for recording is taken, exposure control is performed using the mechanical shutter 115.

<3. Mountable Exchange Lenses>

The camera body 101 of the imaging system 100 can mount each of a plurality of exchange lenses 102 having different image circle sizes in such a manner that it can be mounted or dismounted freely. That is, the camera body 101 can selectively (exchangeably) mount a plurality of exchange lenses designed for exposure regions of different sizes. Furthermore, as such exchange lenses 102, as well as exchange lenses designed for a camera body having an imaging element thereon, exchange lenses designed for a camera body in which a silver salt film is set may be employed.

As described above, in the imaging system 100, it is possible to mount an exchange lens on the camera body 101 if the dimensions of the mounting portion Mt thereof matches the dimensions of the mounting portion Mt of the camera body 101 even if the size of the image circle thereof does not match the size of the imaging element. Thus, as will be described later, an exchange lens with which vignetting could occur might be mounted.

Figure 7:
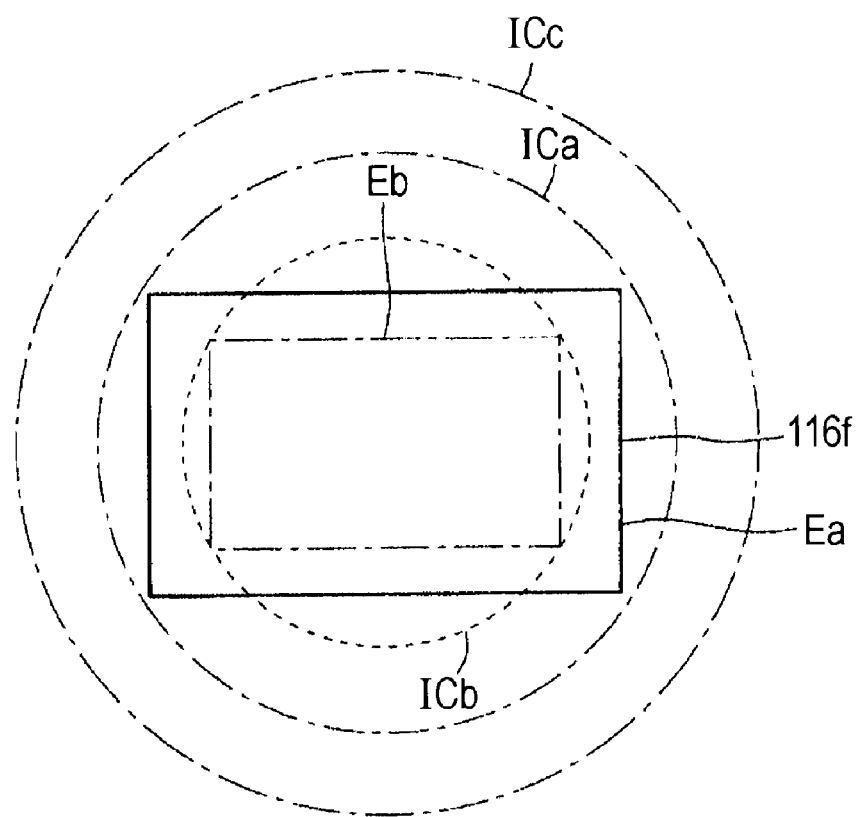
FIG. 7 is a diagram showing relationship between object exposure regions (and image circles) of exchange lenses and imaging regions of imaging elements.

Note that, in this application, regarding each exchange lens 102, an exposure region that is considered in designing thereof will also be referred to as an "object exposure region". For example, many exchange lenses 102a for silver salt film cameras are designed for an exposure region Ea (FIG. 7) of a 35-mm-size film, and the exposure region Ea is referred to as an object exposure region of the exchange lenses 102a. Furthermore, many exchange lenses 102b for APS-size digital cameras are designed for an APS-size imaging region Eb (FIG. 7), and the exposure region Eb is referred to as an object exposure region of the exchange lenses 102b. Furthermore, description will be given assuming that, in this embodiment, the imaging element 116 provided in the camera body 101 has an imaging region 116f (see FIG. 7) of a size (about 36 mm×about 24 mm) corresponding to a 35-mm full-size film. Note that FIG. 7 is a diagram showing relationship between the object exposure regions Ea and Eb of the individual exchange lenses (and their respective image circles ICa and ICb) and the imaging region 116f of the imaging element 116.

By the way, on the camera body 101, it is possible to mount an exchange lens 102 (102a) designed for an exposure region (object exposure region) Ea having the same size as the imaging region 116f of the imaging element 116. Since the size of the object exposure region Ea of the exchange lens 102a is the same as the size of the imaging region 116f of the imaging element 116, as shown in FIG. 7, the imaging region 116f of the imaging element 116 is contained in the image circle ICa of the exchange lens 102a. Thus, in the case where such an exchange lens 102a is mounted on the camera body 101, appropriate imaging is allowed.

Furthermore, on the camera body 101, it is also possible to mount an exchange lens 102 (102c) designed for an exposure region (object exposure region) Ec (not shown) of a size larger than the size of the imaging region 116f of the imaging element 116. The image circle ICc of the exchange lens 102c is larger than the image circle ICa of the exchange lens 102a. Also in this case, the imaging region 116f of the imaging element 116 is contained inside the image circle ICc, so that appropriate imaging is allowed.

Furthermore, on the camera body 101, it is also possible to mount an exchange lens 102 (102b) designed for an exposure region (object exposure region) Eb of a size smaller than the size of the imaging region 116f of the imaging element 116. Specifically, on the camera body 101, it is possible to mount an exchange lens 102 (102b) designed for an APS-size imaging region (about 24 mm×about 16 mm). The image circle ICb of the exchange lens 102b is smaller than the image circle ICa of the exchange lens 102a.

Figure 8:
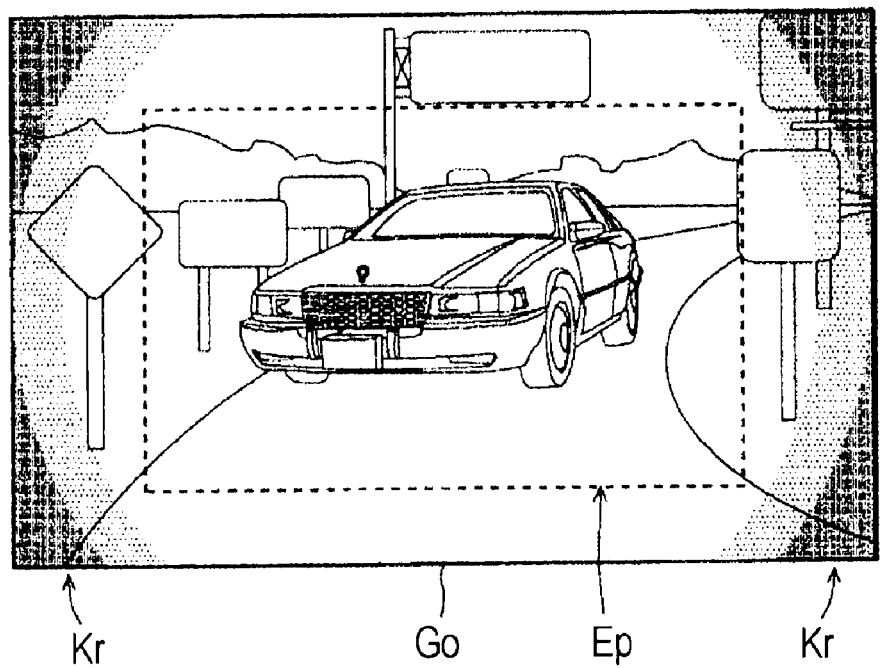
FIG. 8 is a schematic illustration showing vignetting.

However, in a case where such an exchange lens 102b is mounted, as shown in FIG. 7, the imaging region 116f of the imaging element 116 is not contained inside the image circle ICb of the exchange lens 102b. Thus, for example, as shown in FIG. 8, in an image Go acquired by the imaging element 116, vignetting Kr occurs in a peripheral portion of the image due to reduction in luminance at the four corners thereof.

Thus, in the imaging system 100, it is determined whether a state ST0 (hereinafter also referred to as a mismatch state, a too-small-image-circle state, a too-small-lens-mounted state, and so forth) is present, in which the size Se of the object exposure region of the exchange lens 102 currently mounted on the camera body 101 (mounted exchange lens) is smaller than the size Cs of the imaging region 116f of the imaging element 116 (Se<Cs). Then, if the state ST0 is present, an image obtained by cutting out a part of the imaging region 116f of the imaging element 116 by trimming is used as an image for recording, and a live view display is performed using an image (decimated image) in the same region as the image for recording. Specifically, an image in a partial region corresponding to the object exposure region (e.g., Eb) of the exchange lens currently mounted on the camera body 101 (hereinafter also simply referred to as a "mounted lens") is displayed as a live view image, and the image in the partial region is extracted from the imaging region 116f and recorded as an image for recording (shot image) in response to a shooting instruction from an operator.

<4. Details of the Live View Display>

Figure 9:
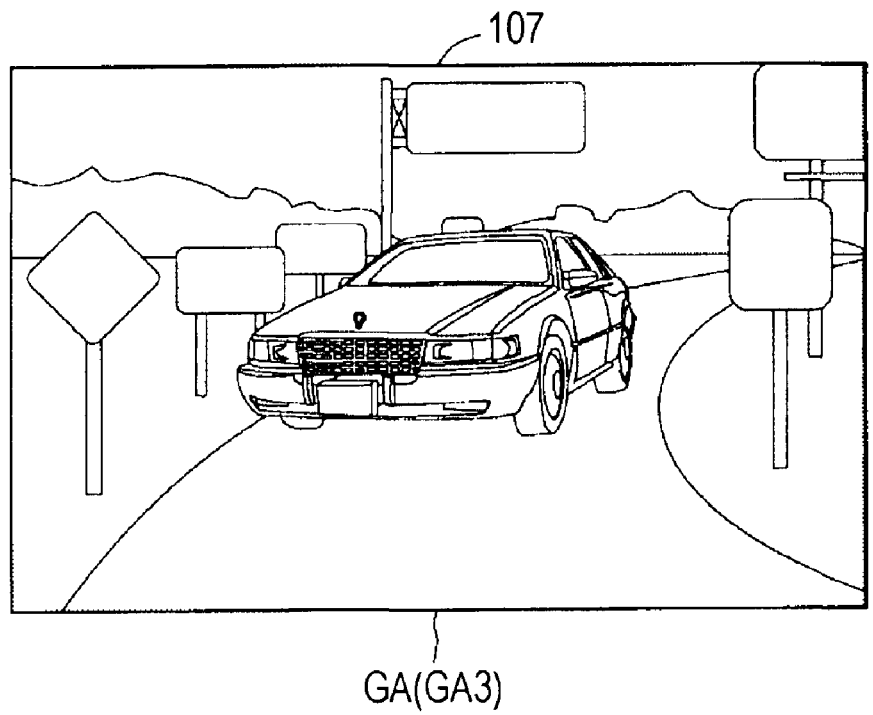
FIG. 9 is an illustration showing a display state by a normal live view display.
Figure 10:
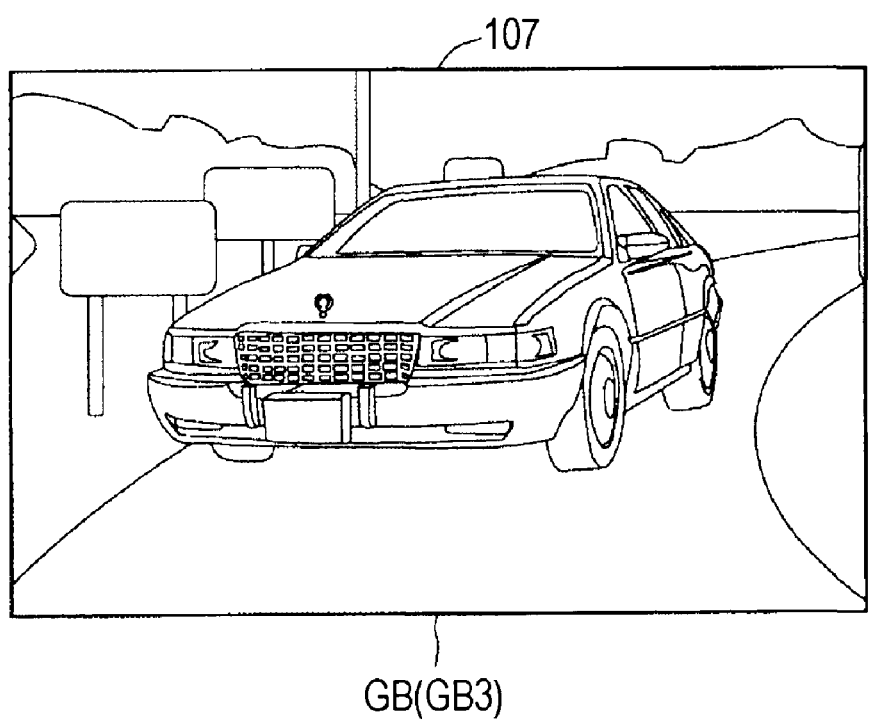
FIG. 10 is an illustration showing a display state by a special live view display.

In this embodiment, in accordance with the magnitude relationship between the size Se of the object exposure region of the exchange lens and the size Cs of the imaging region of the imaging element, two types of live view display, i.e., (a) normal live view display and (b) special live view display, are performed through switching. Specifically, if it is determined that the mismatch state ST0 described above is present (if Se<Cs), (b) special live view display is performed, and if it is determined that the state is otherwise (if Se=Cs or Se>Cs), (a) normal live view display is performed. In (a) normal live view display, an image GA in the imaging region 116f is displayed on the rear monitor 107 (see FIG. 9), and in (b) special live view display, an image GB of a partial region (specifically, a partial region corresponding to the object exposure region of the mounted lens 102) of the imaging region 116f is displayed in an enlarged form on the rear monitor 107 (see FIG. 10). Note that FIG. 9 is an illustration showing a display state on the rear monitor 107 by the normal live view display, and FIG. 10 is an illustration showing a display state on the rear monitor 107 by the special live view display.

First, the normal live view display will be described.

When the normal live view display is performed, the "live view mode MD1" is employed as the driving mode of the imaging element 116.

Figure 11:
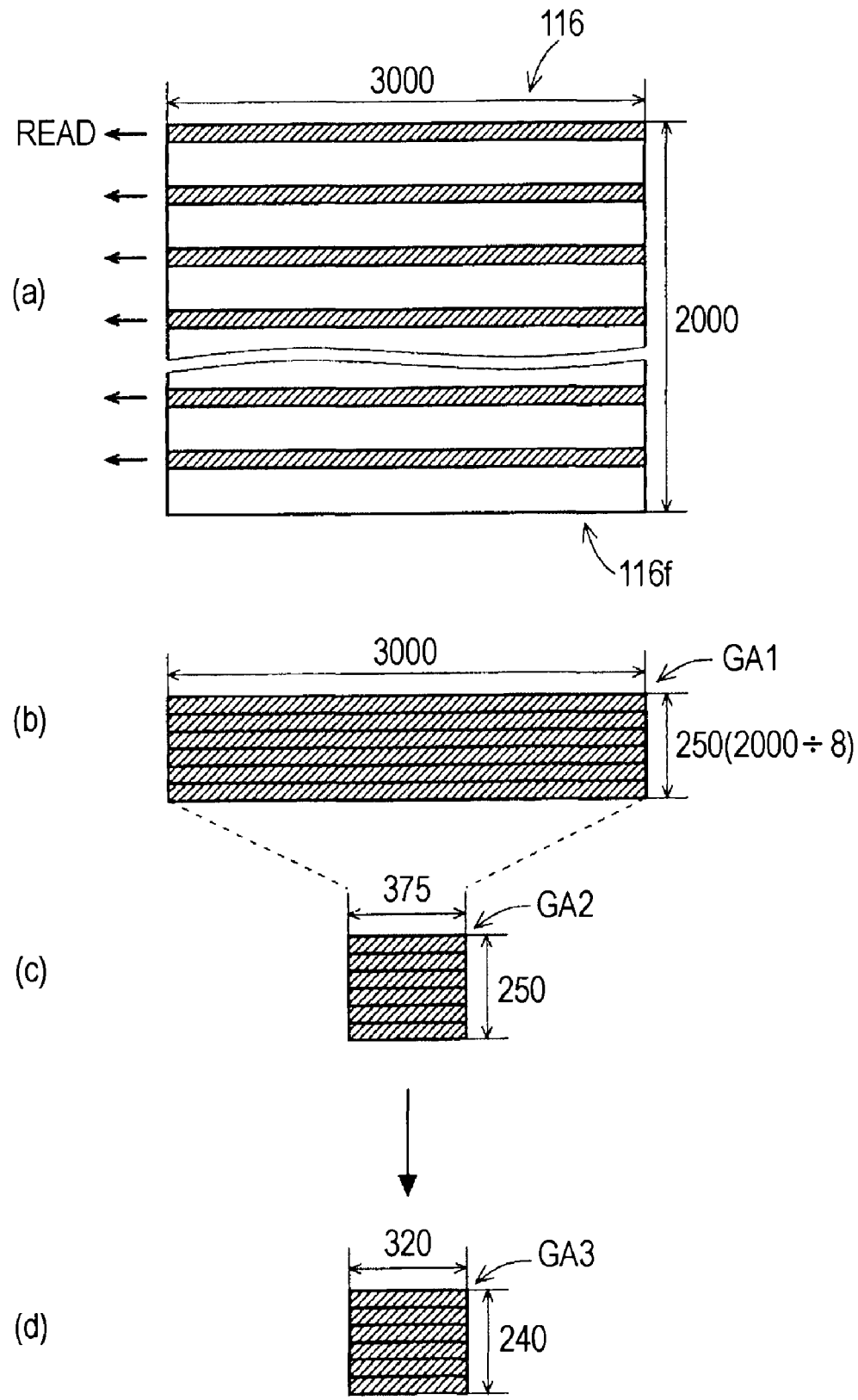
FIG. 11 is a diagram showing an image that is read, etc. in a first live view mode.

As shown in FIGS. 11(*a*) and 11(*b*), in the "live view mode MD1", when image signals on each horizontal line are read from the imaging element 116 having 3000 pixels in the horizontal direction and 2000 pixels in the vertical direction, the imaging element 116 is driven so as to read one line per eight lines. That is, in the "live view mode MD1", the 2000 horizontal lines are read in a ⅛-decimated state (state decimated to ⅛). As a result, an image GA1 output from the imaging element 116 in the "live view mode MD1" is composed of 3000×250 pixels, as shown in FIG. 11(*b*).

Then, the resolution converter 121*c* performs predetermined resolution conversion on the image GA1 so that the number of pixels in the horizontal direction becomes ⅛, whereby an image GA2 composed of 375×250 pixels is obtained, as shown in FIG. 11(*c*). Furthermore, the resolution converter 121*c* performs an interpolating process (resolution conversion) for slight adjustment of the vertical and horizontal numbers of pixels, whereby an image GA3 composed of 320×240 pixels is obtained, as shown in FIG. 11(*d*).

The image GA3 has the same image size as the number of display pixels of the rear monitor 107, and it is an image (see FIG. 9) having as its view a region corresponding to the entire area (the entire imaging region) 116*f* of the imaging region of the imaging element 116.

The image GA3 obtained in this manner is displayed on the rear monitor 107 as a live view image. Note that such images GA3 are sequentially obtained at small time intervals Δt (e.g., 1/30 seconds), and are displayed on the rear monitor 107 at the same intervals Δt. Thus, live view display in a moving-picture-like manner is achieved on the rear monitor 107.

Next, the special live view display will be described.

Figure 12:
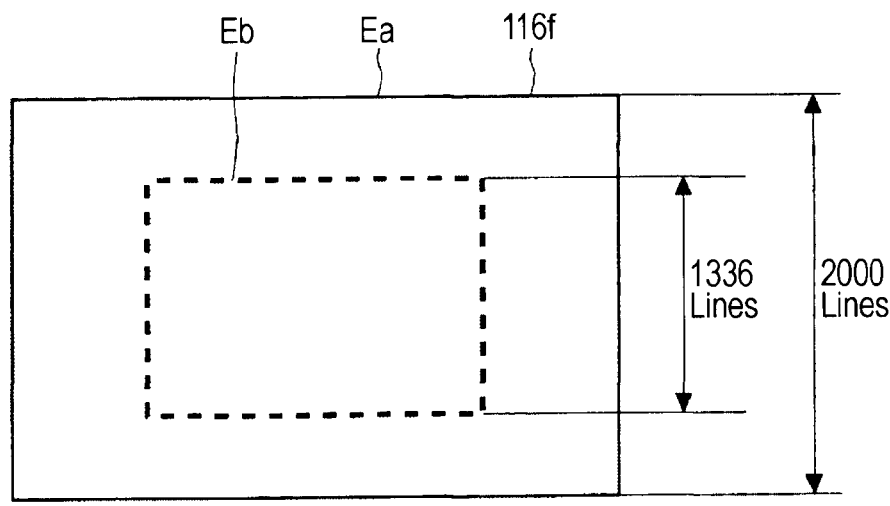
FIG. 12 is a diagram showing relationship between an object exposure region of a mounted lens and an imaging region.

As described earlier, the special live view display is performed if the mismatch sate ST0 is present (i.e., if Se<Cs). The special live view display is performed using a region Eb (see FIG. 12) corresponding to the object exposure region of the mounted lens. Note that, as shown in FIG. 12, horizontal lines existing in the region Eb are 1336 lines, which correspond to about ⅔ (about 16 mm/24 mm=Eb/Ea), among the total of 2000 horizontal lines in the imaging region 116*f*.

Here, it is conceivable to perform the normal live view display described above even if the mismatch state ST0 is present. In this case, however, since the object exposure region of the mounted lens has a size smaller than the imaging region 116*f*, when display similar to the normal live view display is performed, a region Ep (corresponding to a field of view of an image for recording after image trimming) is displayed relatively small on the rear monitor 107.

Thus, in this embodiment, trimming is performed on the entire region of the imaging region 116*f* to generate an image corresponding to a partial region of the imaging region 116*f* (to be specific, an image corresponding to the object exposure region Eb (FIG. 12) of the mounted lens 102). Then, the image corresponding to the partial region Eb is displayed relatively large on the rear monitor 107, thereby performing a live view display (FIG. 10). At this time, on the rear monitor 107, the image of the partial region Eb is displayed in a relatively large area, specifically, in an area (e.g., the entire display region of the rear monitor 107) larger than the region Ep (FIG. 8). The region Ep is also expressed as an area where the partial region Eb is displayed in a live view display (e.g., a normal live view display) when the mismatch state ST0 is not present. Since the image of the partial region Eb is displayed relatively large on the rear monitor 107 as described above, a relatively high visibility can be achieved.

Figure 13:
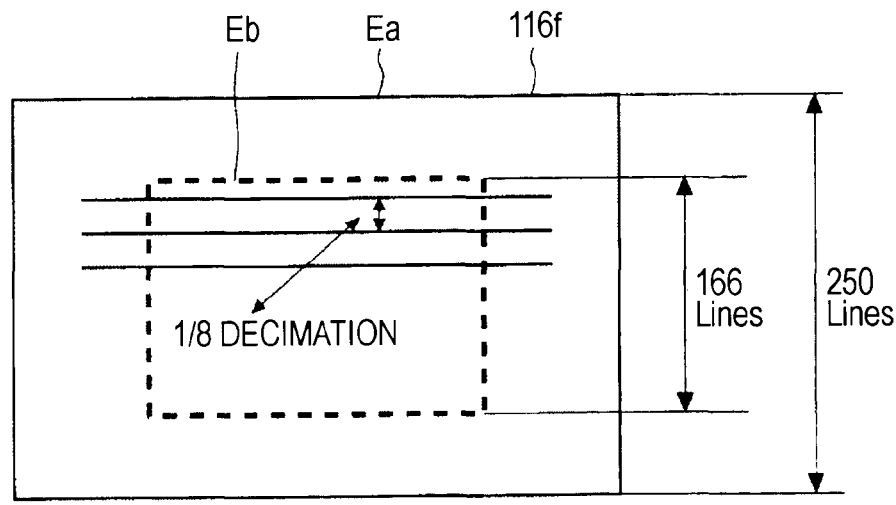
FIG. 13 is a schematic diagram showing a driving operation in the first live view mode through ⅛ decimation.
Figure 14:
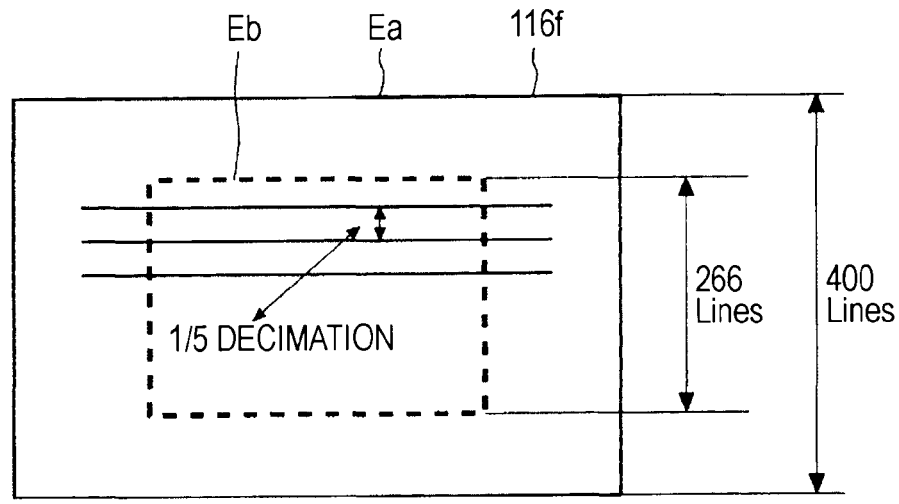
FIG. 14 is a schematic diagram showing a driving operation in a second live view mode through ⅕ decimation.

Furthermore, in the special live view display, the decimation ratio at the time of reading from the imaging element 116 is changed (to be specific, the degree of decimation is reduced) in reading an image of the partial region Eb. That is, in the case where it is determined that the mismatch state ST0 is present, compared with the case where it is determined that the mismatch state ST0 is not present, the degree of decimation is reduced in obtaining an image for live view. Here, an example of a case where an image for live view is obtained through ⅕ decimation using the "live view mode MD2" as the driving mode of the imaging element 116 (FIG. 14) will be described. Assuming the case where the region Eb is read by a driving operation through ⅛ decimation, 166 horizontal lines (FIG. 13) are read among the 1336 horizontal lines (FIG. 12) corresponding to the region Eb. On the other hand, in the case where the region Eb is read by a driving operation through ⅕ decimation, a larger number of horizontal lines (266 horizontal lines) (FIG. 14) can be read among the 1336 horizontal lines (FIG. 12) corresponding to the region Eb. Thus, it becomes possible to perform a live view display that can present a sense of a relatively high resolution.

Furthermore, at the time of reading from the imaging element 116, portions other than the partial region Eb (to be specific, horizontal lines in portions other than the partial region Eb) are not read. Accordingly, it is possible to reduce the reading time. Thus, in a live view display in a moving-picture-like manner, it is possible to prevent reduction of the frame rate and to prevent motion is from becoming unsmooth.

Details of a special live view display operation will be described with reference to FIG. 15.

First, the driving operation of the imaging element 116 is set to the "live view mode MD2". Then, as shown in FIGS. 15(*a*) and 15(*b*), driving is performed so that one line per five lines is read regarding the 1336 horizontal lines corresponding to the region Eb in the imaging region 116*f*. That is, in the live view mode MD2, 1336 horizontal lines are read in a ⅕-decimated state (state decimated to ⅕). As a result, an image GB1 output from the imaging element 116 in the live view mode MD2 is composed of 3000×266 pixels, as shown in FIG. 15(*b*).

Figure 15:
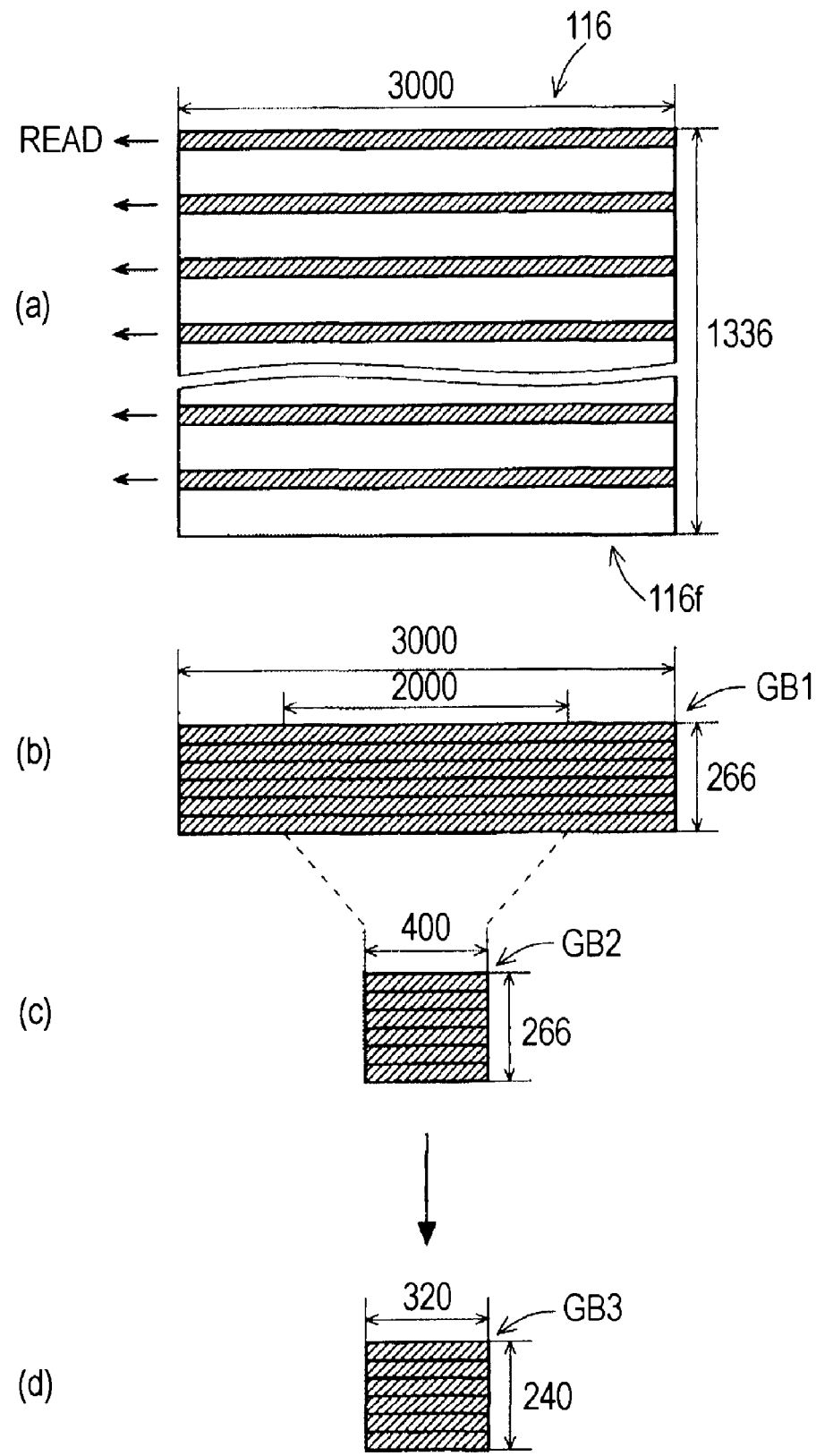
FIG. 15 is a diagram showing an image that is read, etc. in the second live view mode.

Then, the resolution converter 121*c* performs predetermined resolution conversion on the image GB1 so that, regarding the 2000 pixels in a middle portion of each horizontal line (portion corresponding to the object exposure region of the mounted lens), the number of pixels in the horizontal direction becomes ⅕, whereby an image GB2 composed of 400×266 pixels is obtained, as shown in FIG. 15(*c*). Furthermore, the resolution converter 121*c* performs an interpolation process (resolution conversion) for slight adjustment of the vertical and horizontal numbers of pixels, whereby an image GB3 composed of 320×240 pixels is obtained, as shown in FIG. 15(*d*). In the interpolation process, a resolution conversion process (reduction process) of reducing the number of pixels is executed on the image GB2.

The image GB3 is an image having as its view the region Eb (see FIG. 12) corresponding to the object exposure region of the mounted lens in the imaging region 116*f* of the imaging element 116, and it has the same image size as the number of display pixels of the rear monitor 107.

The image GB3 obtained as described above is displayed on the rear monitor 107 as a live view image. Such images GB3 are obtained sequentially at small time intervals Δt (e.g., 1/30 seconds) and displayed on the rear monitor 107 in a moving-picture-like manner.

As described above, the decimation ratio (4/5) at the time of image reading by the "live view mode MD2" in the special live view display is smaller than the decimation ratio (7/8) at the time of image reading by the "live view mode MD1" in the normal live view display. Thus, the image GB2, read by the "live view mode MD2", is obtained as an image having a higher definition than the image GA2. Furthermore, the image GB3 after the reduction process can achieve a sense of higher resolution compared with the image GA3.

<5. Operation of the Imaging System 100>

Figure 16:
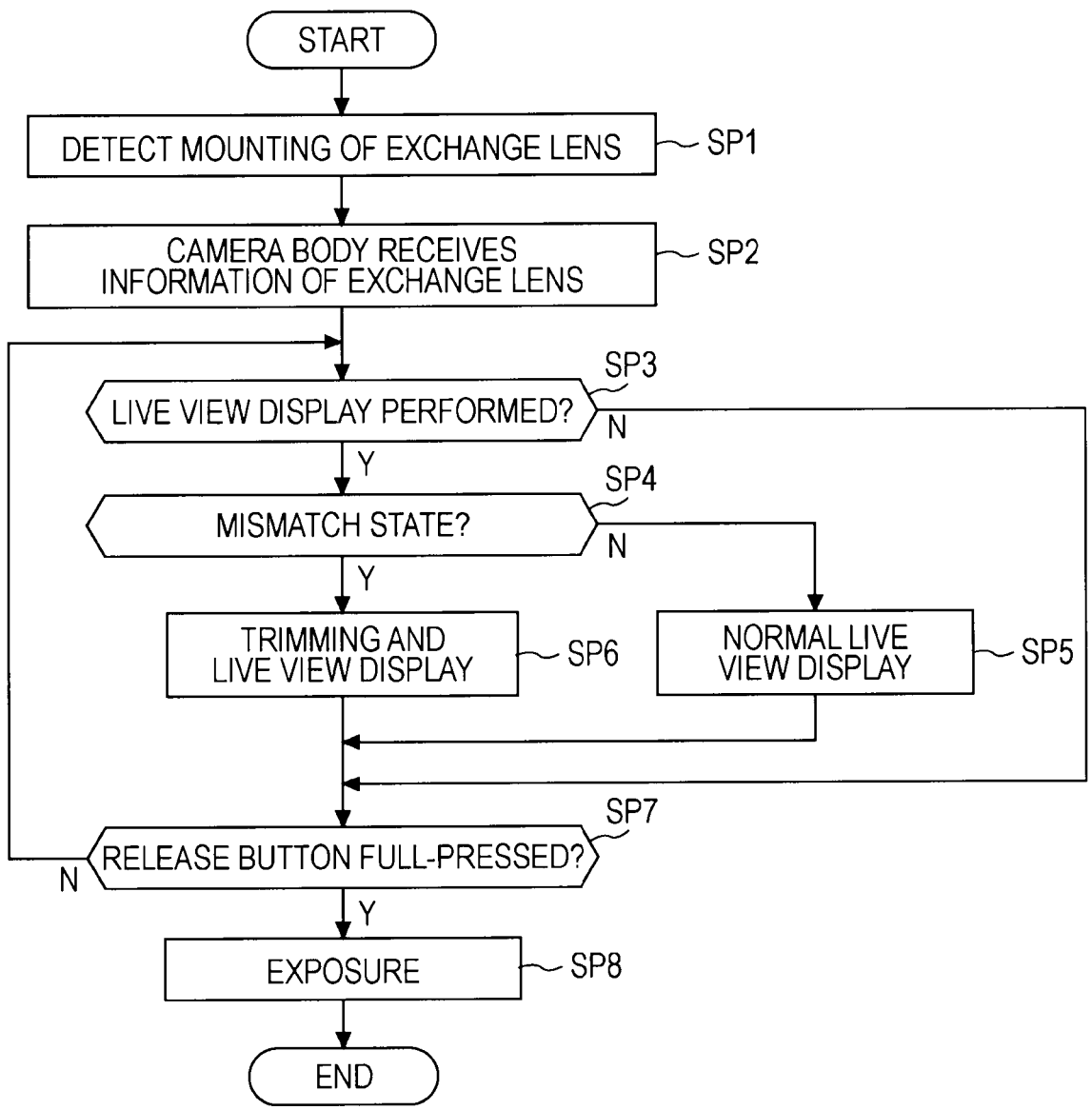
FIG. 16 is a flowchart showing an operation of the imaging system.

FIG. 16 is a flowchart showing a basic operation of the imaging system 100. This operation is executed by the controller 121. The operation of the imaging system 100 will be described with reference to FIG. 16.

First, upon the exchange lens 102 being mounted by a user, the mounting thereof is detected (step SP1). Here, for example, whether the exchange lens 102 has been mounted in the mounting portion Mt or not is detected by determining whether communication with the CPU 181 via the connector EC is allowed or not.

Furthermore, in step SP2, information of the exchange lens 102, stored in the ROM 182, is sent toward the camera body 101 via the connector EC, and the information is received by the controller 121.

In step SP3, the content of setting regarding live view display is checked. In the imaging system 100, using a menu screen or the like displayed on the rear monitor 107, an operator can set in advance whether live view display is to be performed or not. The content of setting (setting value) is stored in the controller 121. If the setting is such that live view display is to be performed, a composition determining operation using the live view display is allowed. If the setting is such that the live view display is not to be performed, a composition determining operation using an optical finder is allowed. In this step SP3, the content of setting (setting value) is checked to determine whether or not to perform live view display.

Then, if the setting is such that live view display is not to be performed, the quick return mirror MR is placed in the fallen state and the mechanical shutter 115 placed in the closed state, as shown in FIG. 5, and then the operation proceeds to step SP7. On the other hand, if the setting is such that live view display is to be performed, the quick return mirror MR is placed in the raised state and the mechanical shutter 115 is placed in the open state, as shown in FIG. 6, and then the operation proceeds to step SP4.

In step SP4, on the basis of the information of the exchange lens 102, received in step SP2, the magnitude relationship between the size of the object exposure region of the exchange lens mounted on the camera body 101 and the size of the imaging region (exposure region) of the imaging element 116 in the camera body 101 is determined.

More specifically, it is determined whether the state ST0 is present, in which the size Se of the object exposure region of the exchange lens 102 currently mounted on the camera body 101 is smaller than the size Cs of the imaging region (exposure region) of the imaging element 116 in the camera body 101.

Specifically, for example, in the case where the model number of the exchange lens 102 is received as unique information of the lens in step SP2, the size of the object exposure region of the exchange lens 102 of the model number is recognized and is compared with the size of the imaging region of the imaging element 116. For example, a data table describing relationship between model numbers of exchange lenses and sizes of imaging regions of suitable imaging elements therefor is stored in a memory of the controller 121 so that it is possible to obtain the size Se of the object exposure region regarding the exchange lens of the relevant model number of the exchange lens by referring to the data table. Furthermore, information regarding the size Cs of the imaging region of the imaging element 116 is obtained by reading it from a ROM (not shown) in the controller 121. Then, by comparing these items of information, it is determined whether the state ST0 described above is present or not.

Then, if the mismatch state ST0 is not present, the operation proceeds to step SP5, and if the mismatch state ST0 is present, the operation proceeds to step SP6.

In step SP5, the normal live view display (live view display by the mode MD1) described earlier is performed.

On the other hand, in step SP6, the special live view display (live view display by the mode MD2) described earlier is performed.

Then, in step SP7, upon the release button 147 being full-pressed by the user, an exposure operation is performed. Thus, an image of a subject is acquired by the imaging element 116. Note that, in this exposure operation, when the mismatch state ST0 is present, of the entire image read by the imaging element 116, a high-definition image (e.g., an image having 2000×1336 pixels) obtained by cutting out the region Eb (see FIG. 7) is recorded as an image for recording. On the other hand, when the mismatch state ST0 is not present, a high-definition image regarding the entire imaging region (e.g., an image having 3000×2000 pixels) is read from the imaging element 116 and is recorded as an image for recording.

<6. Modifications>

In the embodiment described above, an example is described where an image of the object exposure region is read using the "live view mode MD2" as an image for live view display when the mismatch state ST0 is present. However, there is no limitation thereto. For example, an image of the object exposure region may be read by the "live view mode MD1" also when the mismatch state ST0 is present.

Figure 17:
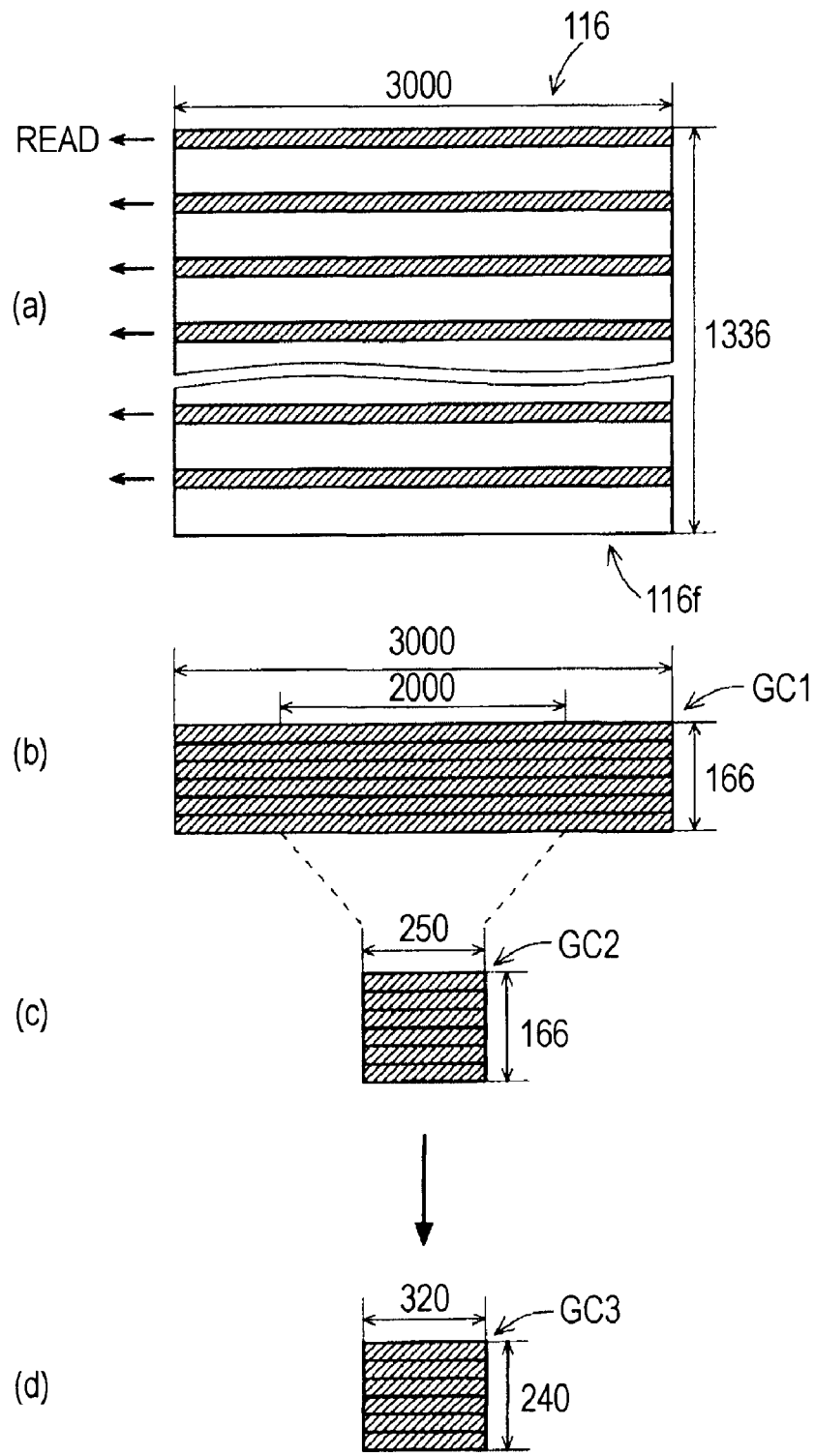
FIG. 17 is an illustration showing an image that is read, etc. according to a modification.

More specifically, first, as shown in FIGS. 17(a) and 17(b), by the "live view mode MD1", the 1336 horizontal lines corresponding to the object exposure region are read in a 1/8-decimated state, whereby an image GC1 composed of 3000×166 pixels is output from the imaging element 116 (FIG. 17(b)). Then, predetermined resolution conversion is executed on the image GC1 so that the number of pixels in the horizontal direction becomes 1/8 regarding the 2000 pixels in a middle portion of each horizontal line (portion corresponding to the object exposure region of the mounted lens), whereby an image GC2 composed of 250×166 pixels is obtained, as shown in FIG. 17(c). Furthermore, an interpolation process (resolution conversion) for slight adjustment of the vertical and horizontal numbers of pixels is executed on the image GC2, whereby an image GC3 composed of 320×240 pixels can be obtained as a live view image, as shown in FIG. 17(d). In the interpolation process, regarding the image GC2, a resolution conversion process that increases the number of pixels both in the horizontal direction and in the vertical direction is executed (i.e., the number of pixels is expanded), whereby the image GC3 is obtained.

In this case, however, when an image of the object exposure region is read by the "live view mode MD1", 7/8 of the 1336 horizontal lines corresponding to the object exposure region are decimated, and the remaining 166 lines corresponding to about 1/8 are read. Thus, only an image GC2 having a less number of horizontal lines than 240, which is the number of horizontal lines of the rear monitor 107, can be obtained. Therefore, even if an expanding interpolation process is executed on the image GC2 to increase the number of pixels in the vertical direction to display it large, it is not possible to achieve a sense of high resolution comparable to that in the above embodiment.

In contrast, according to the embodiment described above, the decimation ratio at the time of reading from the imaging element 116 is changed suitably in accordance with the size of the display region of the rear monitor 107 (to be specific, the vertical and horizontal numbers of pixels (pixel-number size)) (320×240 pixels herein) in reading an image of the partial region Eb. Specifically, in the case where an image of the object exposure region is read by the "live view mode MD2", although ⅘ of the 1336 horizontal lines corresponding to the object exposure region are decimated, the remaining 266 lines, corresponding to about ⅕, are read. That is, it is possible to obtain an image having a relatively large number of horizontal lines, to be specific, a number of horizontal lines larger than 240, which is the number of horizontal lines of the rear monitor 107. Thus, it becomes possible to obtain an image having a sufficient definition and appropriate resolution as an image for display on the rear monitor 107.

Furthermore, preferably, as in the embodiment described above, the number of horizontal lines immediately after reading from the imaging element 116 is to be chosen suitably in accordance with the number of horizontal lines (the number of pixels) of the rear monitor 107. Although the decimation ratio at the time of reading from the imaging element 116 is chosen in the embodiment described above so that the number of horizontal lines (266 lines) immediately after reading from the imaging element 116 is greater than or equal to the number of horizontal lines (240 lines) of the rear monitor 107, there is no limitation thereto. Specifically, the number of horizontal lines after reading from the imaging element 116 should be chosen to be a value (e.g., 216 to 266 lines) within an error range corresponding to about 10% of the number of horizontal lines of the rear monitor 107. To be specific, the number of horizontal lines immediately after reading may be a value (e.g., 216 lines) slightly less than the number of horizontal lines of the rear monitor 107. The number of horizontal lines (the number of pixels in the vertical direction) immediately after reading from the imaging element 116 is considered as suitable for the number of horizontal lines (the number of pixels) of the rear monitor 107 if the number of horizontal lines is within such an error range. This also applies similarly to the number of pixels in the horizontal direction.

Furthermore, although the image GP3 is displayed on the entire rear monitor 107 in the special live view display in the embodiment described above, there is no limitation thereto. For example, a display indicating the presence of the mismatch state ST0 may be attached to a live view image.

Figure 18:
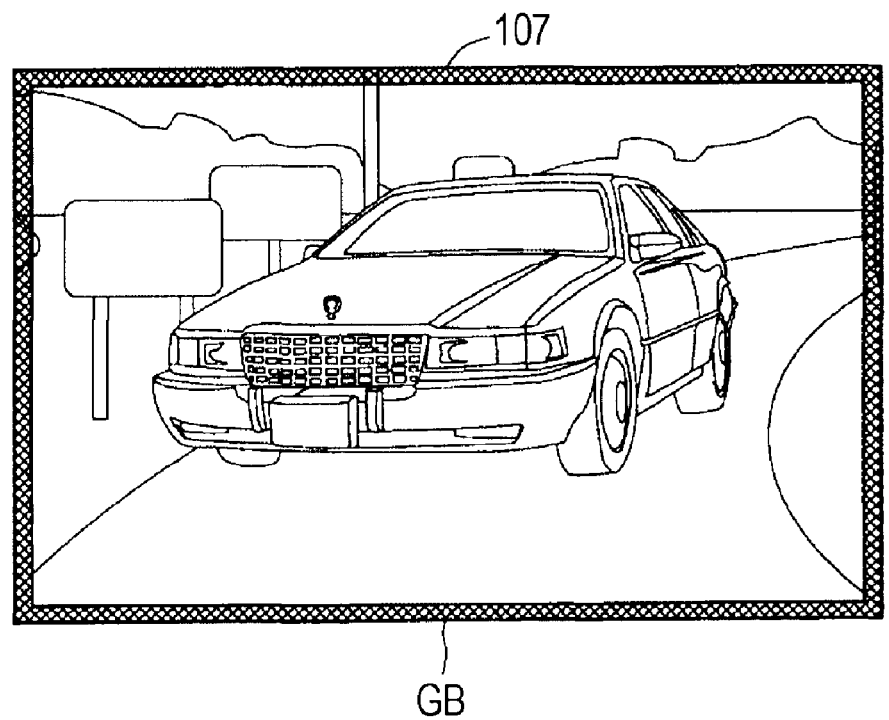
FIG. 18 is a diagram showing a display mode according to a modification.

For example, as shown in FIG. 18, live view display may be performed with an external frame (hatching frame or the like) attached to a live view image. Alternatively, a live view image may be displayed in a partial specified region (partial region) among the entire rear monitor 107. Note that the specified region is preferably a region larger than the region Ep (FIG. 8).

Furthermore, although a case where a CCD-type imaging element is used as the imaging element 116 is described in the embodiment described above, without limitation thereto, a CMOS-type imaging element may be used. Note that in the case where a CMOS-type imaging element is used, it is possible to generate a live view image by directly obtaining pixel signals at desired positions when reading image signals from the imaging element. Thus, when reading an image from the imaging element 116, an image can be read with decimating operations in both the horizontal direction and the vertical direction. Accordingly, for example, without using the image GB1 shown in FIG. 15, it is possible to directly cut out an image corresponding to the image GB2 from the imaging element 116. Similarly, without using the image GC1 shown in FIG. 17, it is possible to directly cut out an image corresponding to the image GC2 from the imaging element 116.

Furthermore, although the type, model number, or the like of the lens is stored in the ROM 182 as information of the exchange lens 102 in the embodiment described above, without limitation thereto, the size of the imaging region of an imaging element compatible with the exchange lens 102 may be directly stored in the ROM 182.

The invention claimed is:

1. An imaging device on which a plurality of exchange lenses designed for object exposure regions of different sizes can be selectively mounted, the imaging device comprising:
   an imaging element having an imaging region;
   display means for displaying an image acquired by the imaging element as a live view image;
   determining means for determining whether a mismatch state is present, which is a state where the size of an object exposure region of an exchange lens mounted on the imaging device is smaller than the size of the imaging region; and
   display control means for generating an image of a partial region of the imaging region in a case where it is determined that the mismatch state is present, and displaying the image of the partial region in an area on the display means as the live view image, the area being larger than an area where the partial region is displayed in a live view display when the mismatch state is not present.

2. The imaging device according to claim 1,
   characterized in that the partial region is a region corresponding to the object exposure region of the exchange lens mounted on the imaging device.

3. The imaging device according to claim 1 or claim 2,
   characterized in that in a case where it is determined that the mismatch state is present, compared with a case where it is determined that the mismatch state is not present, the display control means reduces the degree of decimation at a time of reading from the imaging element in reading an image of the partial region.

4. The imaging device according to claim 1 or claim 2,
   characterized in that in a case where it is determined that the mismatch state is present, the display control means changes a decimation ratio at a time of reading from the imaging element suitably in accordance with the size of the display region of the display means in reading an image of the partial region.

5. The imaging device according to claim 1 or claim 2,
   characterized in that in a case where it is determined that the mismatch state is present, the display control means reads an image from the imaging element at the same decimation ratio as in a case where it is determined that the mismatch state is not present, and displays on the display means an enlarged image obtained by executing a resolution conversion process of increasing the number of pixels on an image corresponding to the partial region in the image that has been read.

6. The imaging device according to claim 1, wherein the live view image is a moving preview image.

7. The imaging device according to claim 1, further comprising:
   a finder window, wherein the display means is monitor which is provided separately from the finder window.

8. An imaging system including an exchange lens and an imaging device on which the exchange lens can be mounted or dismounted, characterized in that:

a plurality of exchange lenses designed for object exposure regions of different sizes can be selectively mounted on the imaging device, and the imaging device includes:

an imaging element having an imaging region;

display means for displaying an image acquired by the imaging element as a live view image;

determining means for determining whether a mismatch state is present, which is a state where the size of an object exposure region of an exchange lens mounted on the imaging device is smaller than the size of the imaging region; and display control means for generating an image of a partial region of the imaging region in a case where it is determined that the mismatch state is present, and displaying the image of the partial region in an area on the display means as the live view image, the area being larger than an area where the partial region is displayed in a live view display when the mismatch state is not present.

9. An imaging device on which a plurality of exchange lenses designed for object exposure regions of different sizes can be selectively mounted, the imaging device comprising:

an imaging element having an imaging region;

a display to display an image acquired by the imaging element as a live view image;

a determining unit configured to determine whether a mismatch state is present, which is a state where the size of an object exposure region of an exchange lens mounted on the imaging device is smaller than the size of the imaging region; and a display controller configured to generate an image of a partial region of the imaging region in a case where it is determined that the mismatch state is present, and display the image of the partial region in an area on the display as the live view image, the area being larger than an area where the partial region is displayed in a live view display when the mismatch state is not present.

* * * * *